(12) United States Patent
Yang et al.

(10) Patent No.: US 8,559,633 B2
(45) Date of Patent: Oct. 15, 2013

(54) METHOD AND DEVICE FOR GENERATING LOCAL INTERFACE KEY

(75) Inventors: Yanmei Yang, Shenzhen (CN); Shuhua Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1210 days.

(21) Appl. No.: 12/348,534

(22) Filed: Jan. 5, 2009

(65) Prior Publication Data

US 2009/0116642 A1 May 7, 2009

Related U.S. Application Data

(63) Continuation of application No. PCT/CN2007/070025, filed on May 17, 2007.

(30) Foreign Application Priority Data

Jul. 4, 2006 (CN) .......................... 2006 1 0098422

(51) Int. Cl.
*H04L 9/00* (2006.01)

(52) U.S. Cl.
USPC .............. 380/44; 708/250; 380/277; 713/171

(58) Field of Classification Search
USPC ....................... 380/44, 277; 708/250; 713/171
See application file for complete search history.

(56) References Cited

U.S. PATENT DOCUMENTS

| 6,198,823 | B1 | 3/2001 | Mills | |
|---|---|---|---|---|
| 2003/0119482 | A1 | 6/2003 | Girard | |
| 2004/0102181 | A1 | 5/2004 | Horn | |
| 2004/0120524 | A1* | 6/2004 | Carroll | ..................... 380/255 |
| 2006/0206710 | A1* | 9/2006 | Gehrmann | ..................... 713/168 |
| 2006/0291660 | A1* | 12/2006 | Gehrmann et al. | ........... 380/277 |
| 2007/0101122 | A1* | 5/2007 | Guo | ............................. 713/153 |

FOREIGN PATENT DOCUMENTS

| CN | 1444755 A | 9/2003 |
|---|---|---|
| CN | 1456993 A | 11/2003 |

OTHER PUBLICATIONS $1^{st}$ Office Action in corresponding Chinese Patent Application No. 200780000303.1 (Feb. 5, 2010).
Written Opinion of the International Searching Authority in corresponding PCT Application No. PCT/CN2007/070025 (Aug. 23, 2007).
International Search Report in corresponding PCT Application No. PCT/CN2007/070025 (Aug. 23, 2007).
$1^{st}$ Office Action in corresponding Chinese Application No. 200610098422.2 (Aug. 21, 2009).
Office Action in corresponding European Patent Application No. 07721648.9 (Aug. 1, 2012).

(Continued)

*Primary Examiner* — April Y Blair
(74) *Attorney, Agent, or Firm* — Leydig, Voit & Mayer, Ltd.

(57) ABSTRACT

A method for generating a local interface key includes: generating a variable parameter; and deriving the local interface key, according to the variable parameter generated and related parameters for calculating the local interface key. The method simplifies the process in which the terminal obtains the local interface key and the system resources are saved. Moreover, the local interface key is derived through the variable parameter and the valid key information. Thus, the security level between the UICC and the terminal is ensured.

14 Claims, 8 Drawing Sheets

(56) References Cited

OTHER PUBLICATIONS

Menezes et al., Handbook of Applied Cryptography, Aug. 2001, pp. 490-491, 498-499, 551-553, 568-569, 578-580, CRC Press, Boca Raton, Florida.

Asokan et al., "Issues in Initializing Security," *IEEE* (*Signal Processing and Information Technology*), 460-465 (Dec. 2005).

Menezes et al., "Handbook of Applied Cryptography," CRC Press LLC (1997).

"Technical Specification Group Services and System Aspects; Generic Authentication Architeture (GAA); Generic Bootstrapping Architecture (Release 7)", 3*GPP*, TS 33.220(V7.4.0): 1-70 (Jun. 2006).

\* cited by examiner

METHOD AND DEVICE FOR GENERATING LOCAL INTERFACE KEY

CROSS-REFERENCE TO RELATED APPLICATIONS

This application is a continuation of International Patent Application No. PCT/CN2007/070025, filed May 17, 2007, which claims priority to Chinese Patent Application No. 200610098422.2, filed Jul. 4, 2006, both of which are hereby incorporated by reference in their entirety.

FIELD OF THE INVENTION

The present invention relates to the field of Generic Authentication Architecture (GAA) technology, particularly, to a method and a device for generating a local interface key.

BACKGROUND OF THE INVENTION

In the standard of 3rd generation wireless communication, GAA is a generic architecture which is used by a plurality of service entities to implement the verification of the user identity. The GAA may be used to check and verify the user identity of an application service. The plurality of application services includes multicast or broadcast service, user certification service, instant messaging service, and proxy service.

FIG. 1A is a diagram showing the structure of the GAA in the art. As shown in FIG. 1A, generally, the GAA includes a user, a bootstrapping service function (BSF) adapted to perform an initial verification for the user identity, a home subscriber server (HSS) and a network application function (NAF). The bootstrapping service function is referred to BSF and the network application function is referred to NAF for short as below. The BSF is adapted to implement a mutual authentication with the user. The process of the mutual authentication includes a mutually identity verification and a sharing key generation for the BSF and the user. The process of the mutual authentication is also referred to as a bootstrapping process or a Generic Bootstrapping Architecture (GBA) process. The user which is able to implement the GBA process with the BSF is referred to as a user having the GBA function. A profile file for describing user information is stored on the HSS and the HSS also has a function for generating authentication information. The NAF may represent different network service application entities. When a user intends to access a service, the user must visit a NAF corresponding to the service and communicate with the NAF. The interfaces among the entities are shown in FIG. 1A. The BSF is connected to the NAF through Zn interface. The user is connected to the BSF or the NAF via a user equipment (UE). The UE is connected to the BSF through Ub interface and to the NAF through Ua interface. In the present invention, the BSF, NAF, and HSS may be referred to as network side.

When a user intends to use a service, if the user knows that the service needs the GBA process in the BSF, the user may directly perform the GBA with the BSF; otherwise, the user may contact with the NAF corresponding to the service. If the NAF uses the GAA and finds that the mutual authentication has not been performed between the user and the BSF, the NAF informs the user to perform the GBA with the BSF, so as to authenticate each other.

The GBA between the user and the BSF includes: sending an authentication request to the BSF by the user; obtaining authentication information of the user from the HSS by the BSF, after receiving the authentication request; performing, by the BSF, the mutual authentication and a key negotiation and generating a sharing key Ks between the user and the BSF, after receiving the authentication information. In addition, the BSF defines a valid period, i.e. key lifetime, for the sharing key Ks so as to update the Ks periodically. The sharing key Ks is used as a root key for deriving a key for a secured communication.

Then, the BSF assigns a session identity (B-TID) to the user. The B-TID is associated with the Ks and may be used for indicating Ks, and the BSF sends the valid period of the Ks to UE.

When the user receives the B-TID, a connection request carrying the B-TID is resent to NAF. The user side obtains the derivation key Ks_NAF through a calculation based on Ks.

When the NAF receives the connection request, the NAF firstly queries whether the B-TID carried by the user is stored locally. If the B-TID can not be found locally, the NAF queries to the BSF. The query message includes the NAF identity (NAF_ID) and the B-TID. If the BSF cannot find the B-TID locally, the BSF informs the NAF that no information of the user exists and the NAF informs the user to perform the authentication with BSF again. After the BSF finds the B-TID, the BSF obtains the derivation key Ks_NAF of Ks with the same algorithm as that of the user side and sends a success response message to the NAF. The success response message includes the B-TID needed by the NAF, the derivation key Ks_NAF corresponding to the B-TID and the valid period of the derivation key configured by the BSF. After the NAF receives the success response message from the BSF, the NAF takes the user as a legal user, which passes the authentication of the BSF. Thus, the NAF and the user share the key Ks_NAF derived from the Ks.

Then, the NAF and the user implement the encryption communication through the Ks_NAF in the following communication.

When the user finds that the Ks is to be expired or the NAF requests the user to perform the authentication with the BSF again, the user may repeat the above steps and perform the authentication with the BSF again, so as to obtain a new sharing key Ks and derivation key Ks_NAF.

The GBA process includes a GBA_ME process and a GBA_U process. As for the GBA_ME process, the key Ks_NAF is generated and stored in Mobile equipment (ME). As for GBA_U process, two keys are generated, and one is a key of the USIM Integrated Circuit Card (UICC) in the ME, that is, Ks_int_NAF, the other is a key of the ME, that is, Ks_ext_NAF.

With the development of the network technology and the market impulse, network convergence becomes the focus in the field. In view of the feature development, the network convergence may make a user use any terminal device, such as mobile station, personal digital assistance (PC), and personal computer (PC), to access a network, such as WLAN, DSL, and GPRS, in any manner. Moreover, only one number is used and only one bill is generated. That means a user may have a plurality of terminal devices which share user information of one UE, such as user information corresponding to the ME and the UICC (the SIM of the GSM and the USIM on the UICC) of the UE. Thus, it is ensured that, not only the UICC or the ME can securely access the network but also other terminal devices can securely access the network through the UICC.

FIG. 1B is a diagram showing the GAA in which the NAF application client and the GBA client are separately located in different environment. As shown in FIG. 1B, a mobile user has a plurality of terminal device including a cell phone and other terminal devices, such as PC, WLAN UE, and PDA. These terminal devices use the same user information of one UE to access the network service. The NAF application client is not located on the UICC but on one or more peripheral terminal devices, except the UICC and the GBA client is located on the UICC.

In view of above, before the terminal device establishes a secure connection with the network, the terminal device must obtain related secret information from the UICC, so as to ensure that the terminal device may access the network or use corresponding service securely. In other words, secret information, such as information of the UICC for performing the mutual authentication between the terminal device and the network and key information required by the terminal device for using a service, needs to be communicated between the terminal device and the UICC. Thus, the security protection must be provided to the local interface UL0 between the terminal device and the UICC. Hence, it is ensured that the information communicated between the terminal device and the UICC will not be stolen or illegally obtained. The security of the whole network can be ensured only when the security of the local interface is ensured.

The terminal device is referred to as terminal for short as below. When a terminal intends to use an application and finds that the Ks_Local which corresponds to the application and is required by the communication with the UICC does not exist on the terminal, or finds that the Ks_Local which corresponds to the application and is required by the communication with the UICC exists on the terminal but the Ks_Local does not exist on the UICC, the terminal initiates a Ks_Local negotiation process. FIG. 2 is flow chart showing a process for negotiating a local interface key between the UICC and the terminal, and includes the following steps.

At Step 200, the terminal requests the UICC to perform a complete GBA process and a GBA_U process relating to the NAF key center, so as to generate related key information.

The NAF key center is a server adapted to negotiate the communication key between the terminal and the UICC.

At Step 200, through the GBA process and the GBA_U process, the sharing key Ks between the terminal/UICC and the BSF is negotiated. The Ks and the key Ks_int_NAF corresponding to the B_TID and NAF identity (NAF_ID) are stored in the UICC.

At Step 201, the terminal sends a request for the B_TID in connection with the Ks_int_NAF generated in the GBA process to the UICC.

The terminal carries the information required for deriving the Ks_Local, such as terminal identity (Terminal_ID) and application ID, in the request.

At Step 202, the UICC derives the Ks_Local using the Ks_int_NAF stored locally and the Terminal_ID received.

At Step 202, the UICC uses the Ks_int_NAF and related information from the terminal to derive the Ks_Local and stores the Ks_Local.

Step 202 may also be performed after step 210.

At Step 203, the UICC sends the B_TID in connection with the Ks_int_NAF to the terminal. Optionally, the NAF_ID may also be included.

At Step 204, the terminal implements the mutual authentication with the NAF and establishes a tunnel. For example, a tunnel based on Hypertext Transfer Protocol over Secure Socket Layer (HTTPS) may be established in the manner of certificate. The implementation of the tunnel is already known by those skilled in the art, and repeated descriptions thereof are omitted herein.

At Step 205, the terminal sends a local key establishment request to the NAF key center via the HTTPS tunnel.

The local key establishment request carries the Terminal_ID and the B_TID obtained. Optionally, other information such as the NAF_ID may also be carried.

At Step 206, the NAF sends a request carrying the B_TID and the NAF_ID of the NAF to the BSF.

At Step 207, the BSF sends a response carrying the Ks_int_NAF and other information, such as the key lifetime, of the Ks_int_NAF to the NAF.

At Step 208, after the NAF determines that the terminal can access the network through the UICC according to the Terminal_ID, the NAF derives the Ks_Local with the same algorithm as that in the UICC using Ks_int_NAf and other related information, and defines a key lifetime for the Ks_Local.

At Step 209, the NAF sends the derived Ks_Local and the key lifetime of the Ks_Local to the terminal.

At Step 210, the terminal stores the Ks_Local and the key lifetime of the Ks_Local received.

To this end, the terminal and the UICC share the Ks_Local and implement a secure communication with the Ks_Local.

The problem in the conventional method for negotiating the Ks_Local between the UICC and the terminal is as follows.

The Ks_Local is derived from the Ks_int_NAF. During the key lifetime of the Ks_int_NAF, when the terminal loses the Ks_Local for the reason that the communication with the network side is interrupted due to a certain reason such as Power Off, a complete negotiation process shown in FIG. 2 is to be implemented in the case that the terminal reinitiates the application corresponding to the Ks_Local. However, the Ks and the related derived key stored in the UICC are not expired. If a new Ks_Local is negotiated according the flow chart shown in FIG. 2, a complete GBA process is to be implemented although the original Ks is still valid. Thus, the original Ks and the derived Key are not made a full use. Moreover, a cumbersome process is caused and the resources are wasted.

In the prior art, it is allowed that an existing Ks and a derived key are used to derive a Ks_Local again. In other words, when the Ks_Local between the terminal and the UICC is invalid or is to be invalid but the Ks_int_NAF for deriving the Ks_Local is valid, the Ks_int_NAF is used to derive the Ks_Local again. However, because the parameters for calculating the key are the same as that for negotiating the lost Ks_Local, the newly derived Ks_Local is the same as the previously derived Ks_Local. Thus, the security level between the UICC and the terminal is lowered.

SUMMARY OF THE INVENTION

In view above, an object of the present invention is to provide a method and a device to generating a local interface key, so that the local interface key is obtained easily and the security level between the UICC and the terminal is ensured. The implementation of the embodiments of the present invention is as follows.

A method for generating a local interface key includes: A. generating a variable parameter; and B. deriving the local interface key, according to the variable parameter generated and related parameters for calculating the local interface key.

A terminal includes a variable parameter generation module and a sending module. The variable parameter generation module is adapted to generate a variable parameter. The sending module is adapted to sending the variable parameter generated to a USIM Integrated Circuit Card, UICC or a network side.

A UICC includes a first receiving module and a first processing module. The first receiving module is adapted to receive a variable parameter from a terminal. The first processing module is adapted to derive a local interface key by using the variable parameter received.

A NAF includes a second receiving module and a second processing module. The second receiving module is adapted to receive a variable parameter from a terminal. The second processing module is adapted to derive a local interface key, according to the variable parameter received.

As can be seen from above, in the technical solution of the present invention, a variable parameter is generated and the local interface key is derived, according the variable parameter and related parameters for calculating the local interface key. The related parameters for calculating the local interface key are known in the art. According to the technical solution of the present invention, the process for obtaining the local interface key by the terminal is simplified, and the time for negotiating the Ks_Local is saved. Thus, the system resources are saved. Meanwhile, according to the present invention, a local interface key is derived again and obtained according to the variable parameter, such as random number and time stamp, and valid key information, such as root key Ks and Ks_int_NAF derived from the Ks. Thus, the security level between the UICC side and the terminal is ensured, where the UICC side represents the UICC and the device to which the UICC belongs to. Therefore, according to the method of the present invention, during the key lifetime of the Ks or the derivation key of the Ks, the Ks or the derivation key of the Ks may be used again to derive a new Ks-Local. Thus, a complete GBA process does not need to be performed again each time when the Ks_Local is updated, and the time for negotiating the Ks_Local and the system resources id saved.

DETAILED DESCRIPTION OF THE EMBODIMENTS

The implementation of one embodiment of the present invention includes: generating a variable parameter; and deriving a local interface key, according to the variable parameter generated and related parameters for calculating the local interface key.

The objects, technical solution and other advantages of the present invention will be more clearly understood from the following detailed description, taken in conjunction with the accompanying drawings.

Figure 1A:
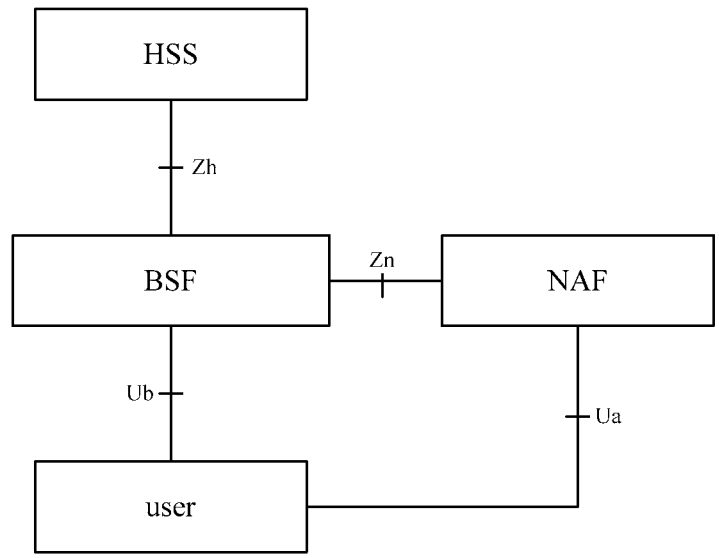
FIG. 1A is a diagram showing the structure of the GAA.
Figure 1B:
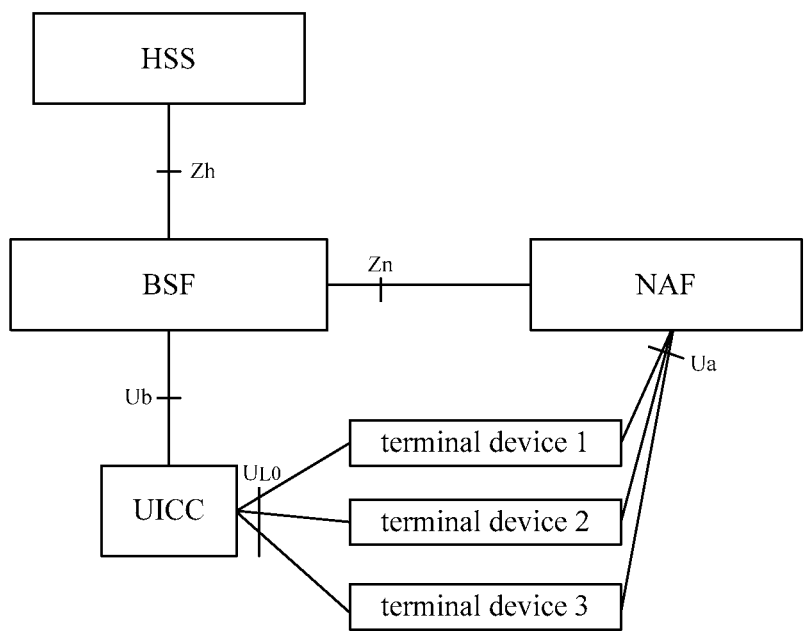
FIG. 1B is a diagram showing the GAA in which the NAF client and the GBA client are separate.
Figure 2:
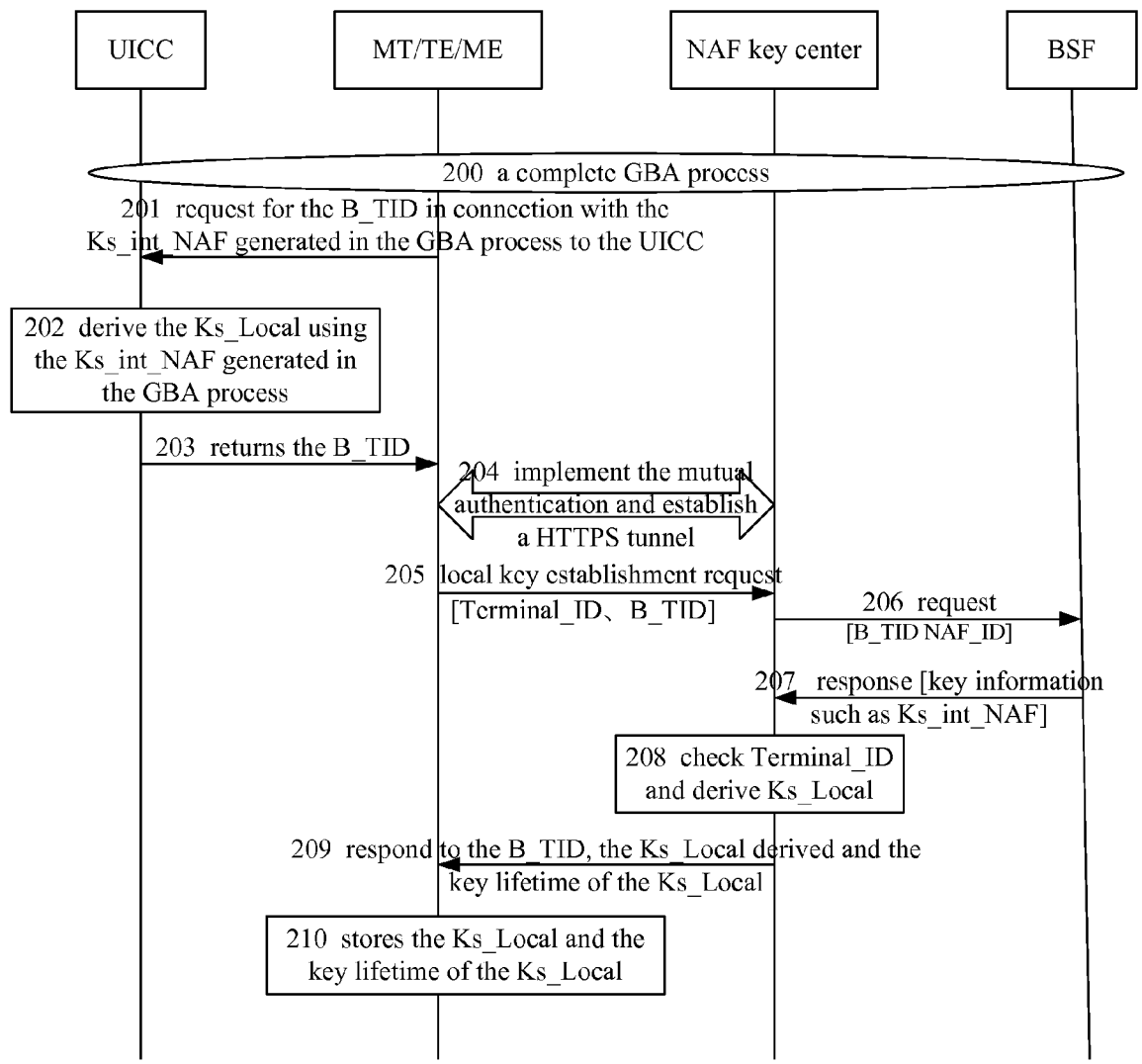
FIG. 2 is flow chart showing a process for negotiating a local interface key between the UICC and the terminal.
Figure 3:
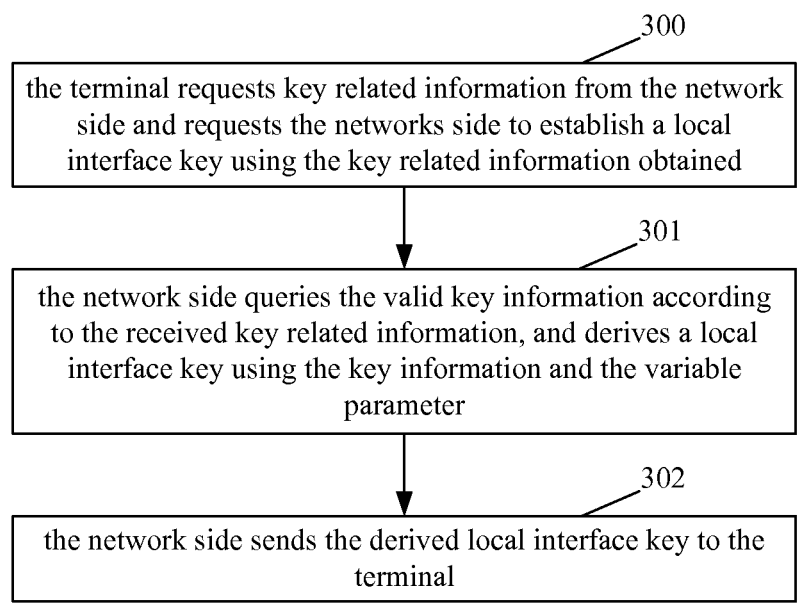
FIG. 3 is a flow chart showing a process in which the terminal obtains the local interface key, according to the present invention.

FIG. 3 is a flow chart showing a process in which the terminal obtains the local interface key according to the present invention. The NAF key center in the present invention is a NAF entity. When the terminal use an application, the process includes the following steps.

At Step 300, the terminal obtains key related information and requests the network side to acquire a local interface key using the key related information obtained.

At Step 300, the terminal may obtain the key related information through the request to the UICC. The key related information may be the key identity information, such as B_TID or the key lifetime. Herein, the UICC side represents the UICC or a device to which the UICC belongs to.

At Step 301, the network side queries the valid key information, according to the received key related information, and derives the local interface key, using the key information and the generated variable parameter.

At Step 301, the network side queries the valid Ks_int_NAF or the Ks corresponding to the received key related information, and derives a Ks_Local which is different from the Ks_local derived previously, according the variable parameter, such as a random number, a time stamp, or the value of a synchronous counter, and the Ks_int_NAF, or derives a Ks_int_NAF which is different from the Ks_int_NAF derived previously, according to the variable parameter, such as a random number or a time stamp, and Ks and then derives the Ks_Local by using the Ks_int_NAF.

At Step 302, the network side sends the derived local interface key to the terminal.

Before Step 302 or after Step 302, the method further includes: deriving the Ks_Local by the UICC side using the valid Ks_int_NAF and the variable parameter which is the same as that used by the network side and storing the derived Ks_Local; or deriving a Ks_int_NAF which is different from the Ks_int_NAF derived previously using valid Ks and the variable parameter which is the same as that used by the network side, and then deriving the Ks_Local using the Ks_int_NAF.

Moreover, before Step 300, the terminal may judge whether the Ks_Local corresponding to the application to be used is stored on itself If the Ks_Local is stored on the terminal, the terminal sends a query request to the UICC side to query whether the Ks_Local is valid at the UICC side. A counter may be configured at the UICC side to indicate whether the Ks_Local is valid. If the value of the counter is 0 or NULL, it is indicated that the Ks_Local is invalid and an invalid response is returned, and the terminal re-initiates a new key negotiation process. If the value of the counter is not 0 or NULL, it is indicated that the Ks_Local is valid and the Ks_Local is directly used to communicate with the UICC.

If the Ks_Local is not stored on the terminal, the terminal queries whether the Ks_Local corresponding to the application to be used at the UICC side expires. If the Ks_Local expires, the flow chart shown in FIG. 3 is implemented. If the Ks_Local does not expire, the terminal may directly request the Ks_Local corresponding to the current application from the NAF key center. Even the Ks_Local corresponding to the current application in the UICC does not expire, a new Ks_Local may also be obtained through the flow chart shown in FIG. 3.

The implementation of the present invention at the UICC side will be described in detail, in conjunction the embodiments of the present invention as below.

In the first embodiment, the related key, such as Ks_int_NAF, is valid and it is assumed that the variable parameter is a random number RAND.

Figure 4:
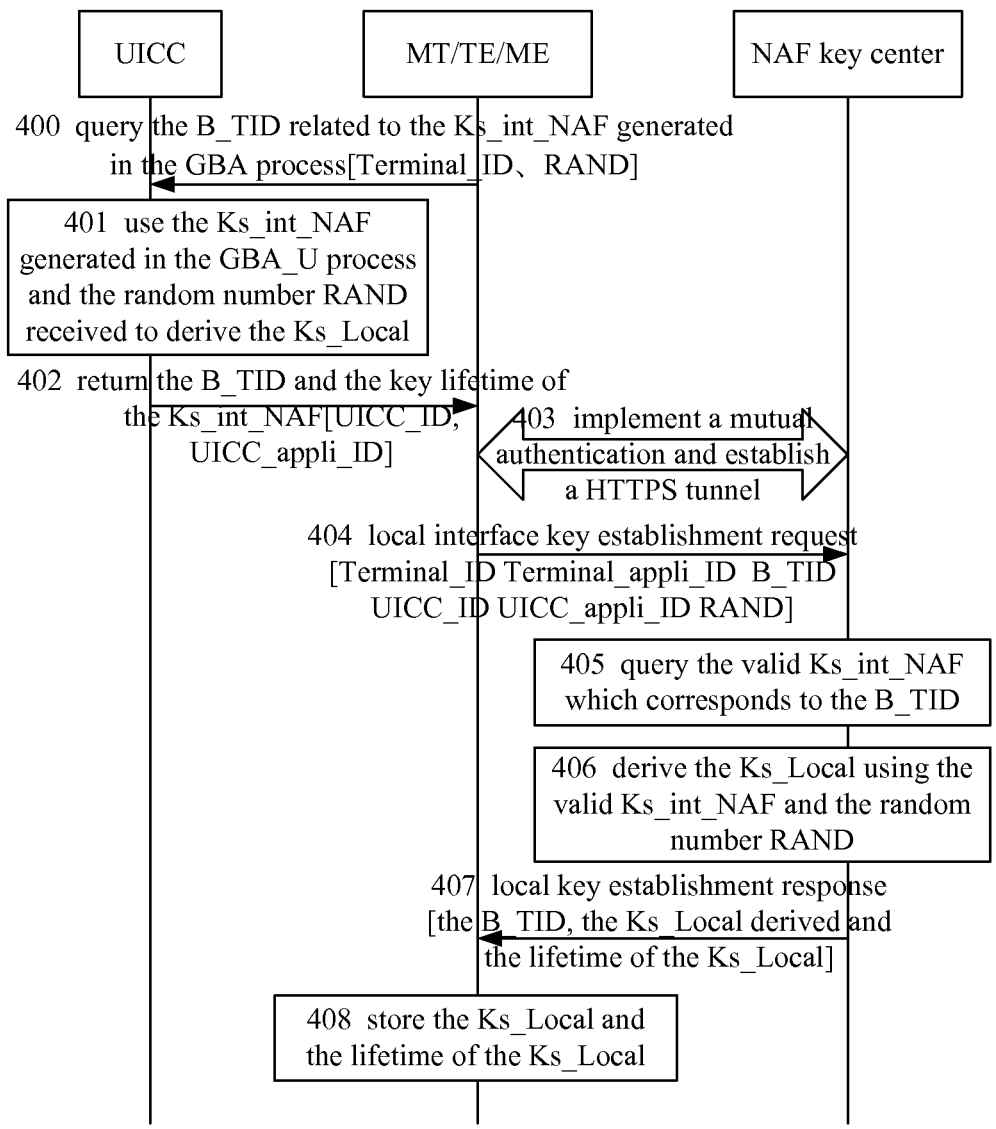
FIG. 4 is a flow chart showing a first embodiment in which the terminal obtains the local interface key, according to the present invention.

FIG. 4 is a flow chart showing the first embodiment in which the terminal obtains the local interface key, according to the present invention. The flow includes the following steps.

At Step 400, the terminal queries the B_TID related to the Ks_int_NAF generated in the GBA process to the UICC, and the terminal may further request the local interface key derivation instruction.

The query request may carry at least one of the Terminal_ID, the Terminal_appli_ID, and the random number RAND.

At Step 400, the terminal needs to generate the random number RAND required for generating the local interface key and store the random number. The method for generating the random number is known in the art and repeated description thereof is omitted herein. The random number RAND may also be carried in a single local key derivation instruction and sent to the UICC. In other words, the local interface key derivation instruction is not performed at Step 400, but is sent at other step in the form of a single local key derivation instruction.

The step for checking by the terminal whether a valid Ks exists at the UICC side may also be included before or after this step. If no Ks exist or the existing Ks expires, a complete GBA process needs to be initiated to negotiate a new Ks. Thus, because the terminal may obtain the B-TID, the process in Step 400 for querying the B-TID of the Ks_int_NAF may be omitted. Optionally, the process for querying the Ks_int_NAF may also be performed by the UICC before calculating the Ks_local, so as to know whether the UICC stores an available Ks_int_NAF.

At Step 401, the UICC uses the Ks_int_NAF generated in the GBA_U process and the random number RAND received to derive and store the Ks_Local.

If no available Ks_int_NAF exists in the UICC, the GBA_U key derivation process needs to be performed. The GBA_U process may be performed by the UICC after receiving the local key derivation instruction, or may be performed by the UICC before receiving the local key derivation instruction and after receiving the GBA_U key derivation instruction.

Step 401 may be performed after Step 402 or Step 408. The local key derivation instruction in Step 400 may be implemented before Step 401 and after Step 402 or Step 408.

At Step 402, the UICC sends the B_TID corresponding to the Ks_int_NAF generated in the GBA process to the terminal. Further, the key lifetime corresponding to the Ks_int_NAF may also be included and sent to the terminal.

At Step 402, in the case that the key lifetime is further included when the UICC returns the B_TID to the terminal, the UICC may also send the UICC identity UICC_ID of the UICC and the UICC application identity UICC_appli_ID to the terminal.

Step 402 may further include: determining by the terminal whether the Ks_int_NAF expires, according to the key lifetime of the Ks_int_NAF. If the Ks_int_NAF does not expire, Step 403 is performed; if the Ks_int_NAF expires, the GBA process is triggered and the flow turns to Step 400.

At Step 403, the terminal and the NAF key center implement a mutual authentication and a safe tunnel, such as HTTPS tunnel, is established.

The implementation of Step 403 is known in the art, and repeated description thereof is omitted herein.

At Step 404, the terminal sends the local interface key establishment request to the NAF key center via the established HTTPS tunnel.

The local key establishment request carries the Terminal_ID, the Terminal_appli_ID, the obtained B_TID, the UICC_ID, the UICC_appli_ID and the random number RAND stored on the terminal. Thus, the NAF key center may generate a valid local interface key for each application.

At Steps 405 to 406, the NAF key center queries the valid Ks_int_NAF which is stored on the NAF key center and corresponds to the B_TID, and derives the Ks_Local, and assigns the key lifetime of the Ks_Local using the valid Ks_int_NAF and the random number RAND received. The information for deriving the Ks_Local also includes other information, such as the Terminal_ID, the Terminal_appli_ID, the UICC_ID, and the UICC_appli_ID. The algorithm for deriving the Ks_Local is not described herein for short.

The UICC and the NAF key center use the same algorithm for deriving the Ks_Local.

These steps directly use the stored key information i.e. the valid Ks_int_NAF to derive the Ks_Local so as to simplify the process for obtaining the local interface key by the terminal. Thus, the time for negotiating the Ks_Local is saved and the network resources are also saved. Moreover, by using a random number, the derived Ks_Local is different, even the Ks_int_NAF is the same. Thus, the security level between the terminal and the UICC is guaranteed.

If the Ks_int_NAF corresponding to the B_TID does not exist in the NAF key center; in other words, if the Ks_int_NAF is invalid, the NAF key center may request the key information from the BSF. The process thereof is disclosed in the prior art and thus repeated description is omitted herein.

In these steps, before using the valid Ks_int_NAF to derive the Ks_Local, the flow further includes: querying, by the NAF key center, whether the terminal is limited to using the UICC to access the network through the Terminal_ID and UICC_ID. The process of querying is known in the art, and may be based on a database on the NAF key center storing information regarding which terminal is allowed to use a UICC or which terminal is not allowed to use a UICC. If the terminal is allowed to use the UICC to access the network, the Ks_int_NAF and related information is used to derive the Ks_Local. If the terminal is not allowed to use the UICC to access the network, a response for indicating that the terminal has no right to use the UICC to access the network is returned.

At Step 407, the NAF key center sends a local key establishment response carrying the B_TID, the Ks_Local derived and the lifetime of the Ks_Local to the terminal via the tunnel.

At Step 408, the terminal stores the Ks_Local received and the lifetime of the Ks_Local.

To this end, the terminal and the UICC share the Ks_Local and use the Ks_Local to establish a secure communication.

In the second embodiment of the present invention, the key relating to the NAF, such as Ks_int_NAF, is valid.

The difference between the first embodiment and the second embodiment lies in that, the entities which involve the derivation of the variable parameter of the Ks_Local are different. According to the first embodiment, the variable parameter is generated by the terminal. However, according to the second embodiment, two conditions and opportunities for generating the variable parameter are described:

(1) Before the NAF key center derives the Ks_Local, the UICC generates the variable parameter as the parameter for deriving the Ks_Local, and sends the variable parameter to the NAF key center via the terminal. The NAF key center may use the variable parameter as a parameter for deriving the Ks_Local, and use the same algorithm as that used by the UICC to generate the same Ks_Local as generated by the UICC.

(2) Before the UICC derives the Ks_Local, the NAF key center generates the variable parameter as the parameter for deriving the Ks_Local during deriving the Ks_Local, and sends the variable parameter to the UICC via the terminal. The UICC may use the variable parameter as the parameter for deriving the Ks_Local, and use the same algorithm as that used by the NAF key center to generate the same Ks_Local as that generated by the NAF key center. The variable parameter may also be generated when the BSF calculates the Ks_int_NAF and then be sent to the UICC via the terminal. The UICC uses the Ks stored and the received variable parameter to derive the Ks_int_NAF and derives the Ks_Local using the Ks_int_NAF, when a request for deriving the local interface key is received.

Figure 5:
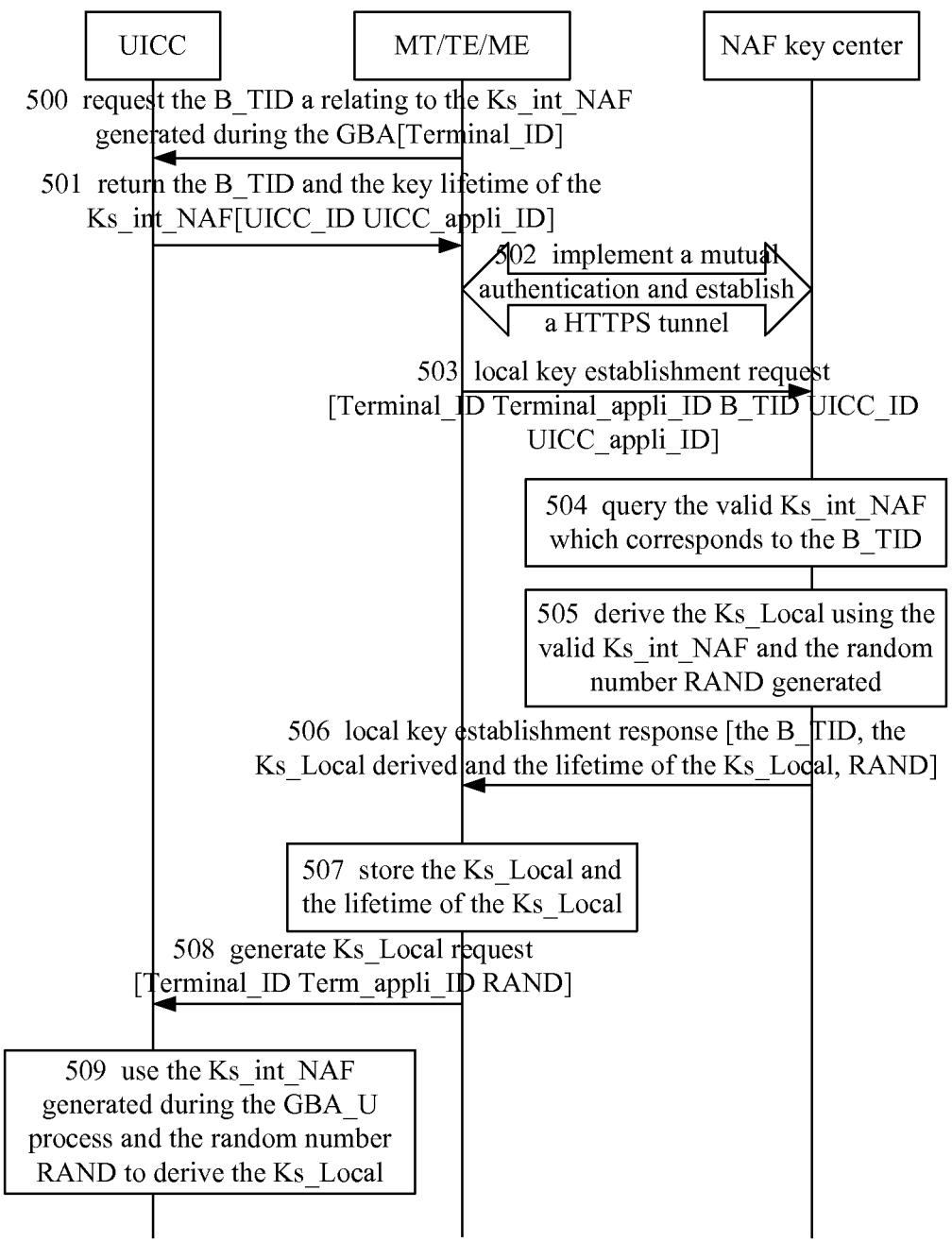
FIG. 5 is a flow chart showing a second embodiment in which the terminal obtains the local interface key, according to the present invention.

FIG. 5 is a flow chart showing a second embodiment in which the terminal obtains the local interface key, according to the present invention. In the second embodiment, the method for deriving the Ks_Local by the NAF key center before the UICC derives the Ks_Local is taken as an example, and the method includes the following steps.

At Step 500, the terminal sends a request for requesting the B_TID and the key lifetime relating to the Ks_int_NAF generated during the GBA to the UICC and the request carries the Terminal_ID and the Terminal_appli_ID.

The step for checking by the terminal whether a valid Ks exists at the UICC side may also be included before or after Step 500. If no Ks exist or the existing Ks expires, a complete GBA process needs to be initiated to negotiate a new Ks. Thus, because the terminal may obtain the B-TID, the process in Step 500 and Step 501 for querying the B-TID of the Ks_int_NAF may be omitted. Optionally, the process for querying the Ks_int_NAF may also be performed before requesting the UICC to calculate the Ks_local, so as to know whether the UICC stores an available Ks_int_NAF.

At Step 501, the UICC sends the B_TID corresponding to the Ks_int_NAF generated in the GBA process and other information, such as key lifetime, to the terminal.

At Step 501, the UICC sends the UICC_ID and the UICC_appli_ID of the UICC to the terminal, when the UICC returns the B_TID and the key lifetime of the Ks_int_NAF to the terminal.

At Step 502, the terminal implements a mutual authentication with the NAF and establishes a HTTPS tunnel.

The implementation of Step 502 is known in the art, and repeated description thereof is omitted herein.

At Step 503, the terminal sends a local key establishment request to the NAF key center through the HTTPS tunnel established.

The local key establishment request carries the Terminal_ID, the Terminal_appli_ID, the obtained B_TID, the UICC_ID, and the UICC_appli_ID. Thus, the NAF key center may generate a valid local interface key for each application.

At Steps 504 to 505, the NAF key center queries the valid Ks_int_NAF, which is stored on the NAF key center and corresponds to the B_TID and generates a random number RAND, and derives the Ks_Local and assigns the key lifetime of the Ks_Local, using the valid Ks_int_NAF and the random number RAND generated.

In this step, the method for generating and storing the random number RAND by the NAF key center is known in the art, and repeated descriptions thereof are omitted herein.

These steps directly use the stored key information i.e. the valid Ks_int_NAF for deriving the Ks_Local so as to simplify the process for obtaining the local interface key by the terminal. Thus, the time for negotiating the Ks_Local is saved, and the network resources are also saved. Moreover, by using a random number, the derived Ks_Local is different even the Ks_int_NAF is the same. Thus, the security level between the terminal and the UICC is guaranteed.

If the Ks_int_NAF corresponding to the B_TID does not exist in the NAF key center or the Ks_int_NAF is invalid, the NAF key center may request the key information from the BSF. The process thereof is disclosed in the prior art and, thus, repeated descriptions are omitted herein.

In these steps, before using the valid Ks_int_NAF to derive the Ks_Local, the flow further includes querying, by the NAF key center, whether the terminal is allowed to use the UICC to access the network, based on the Terminal_ID and the UICC_ID. If the terminal is allowed to use the UICC to access the network, the Ks_int_NAF and related information are used to derive the Ks_Local. If the terminal is not allowed to use the UICC to access the network, a response for indicating that the terminal has no right to use the UICC to access the network is returned.

At Step 506, the NAF key center sends a local key establishment response carrying the B_TID, the random number RAND stored on the NAF key center, the Ks_Local derived, and the lifetime of the Ks_Local, to the terminal via the HTTPS tunnel.

At Step 507, the terminal stores the Ks_Local received and the lifetime of the Ks_Local.

At Step 508, the terminal sends a request for generating the Ks_Local to the UICC and the request carries the Terminal_ID, the Terminal_appli_ID, and the random number RAND from the NAF key center.

At Step 509, the UICC uses the valid Ks_int_NAF generated during the GBA_U process, and the received random number RAND to derive and store the Ks_Local.

The UICC and the NAF key center use the same derivation algorithm to derive the Ks_Local.

The GBA_U process may be performed at this step or be performed at any step before Step 508.

To this end, the terminal and the UICC share the Ks_Local and use the Ks_Local to implement a secure communication.

The variable parameter RAND for calculating the local interface key as shown in FIG. 5 may also be generated by the UICC or the terminal. If the UICC generates the variable parameter RAND, Steps 508 and 509 may be performed before Step 502 and the UICC may send the value of the RAND generated by the UICC to the terminal, after Steps 508 and 509 are successfully performed. At Step 503, the terminal sends the value of the RAND to the network side so that the network side may use the same RAND to calculate the local key.

If the terminal generates the value of the variable parameter RAND, as described in the first embodiment, the above steps may be performed, in accordance with the sequence of the steps as described in the fifth embodiment. Optionally, Steps 508 and 509 may be performed before Step 502, or be performed with Steps 502-507 simultaneously. At Step 503, the value of the RAND generated by the terminal needs to be sent to the network side, so that the network side may use the same RAND to calculate the local key.

In the third embodiment of the present invention, the NAF related key Ks_int_NAF is invalid, while the Ks is valid.

Figure 6:
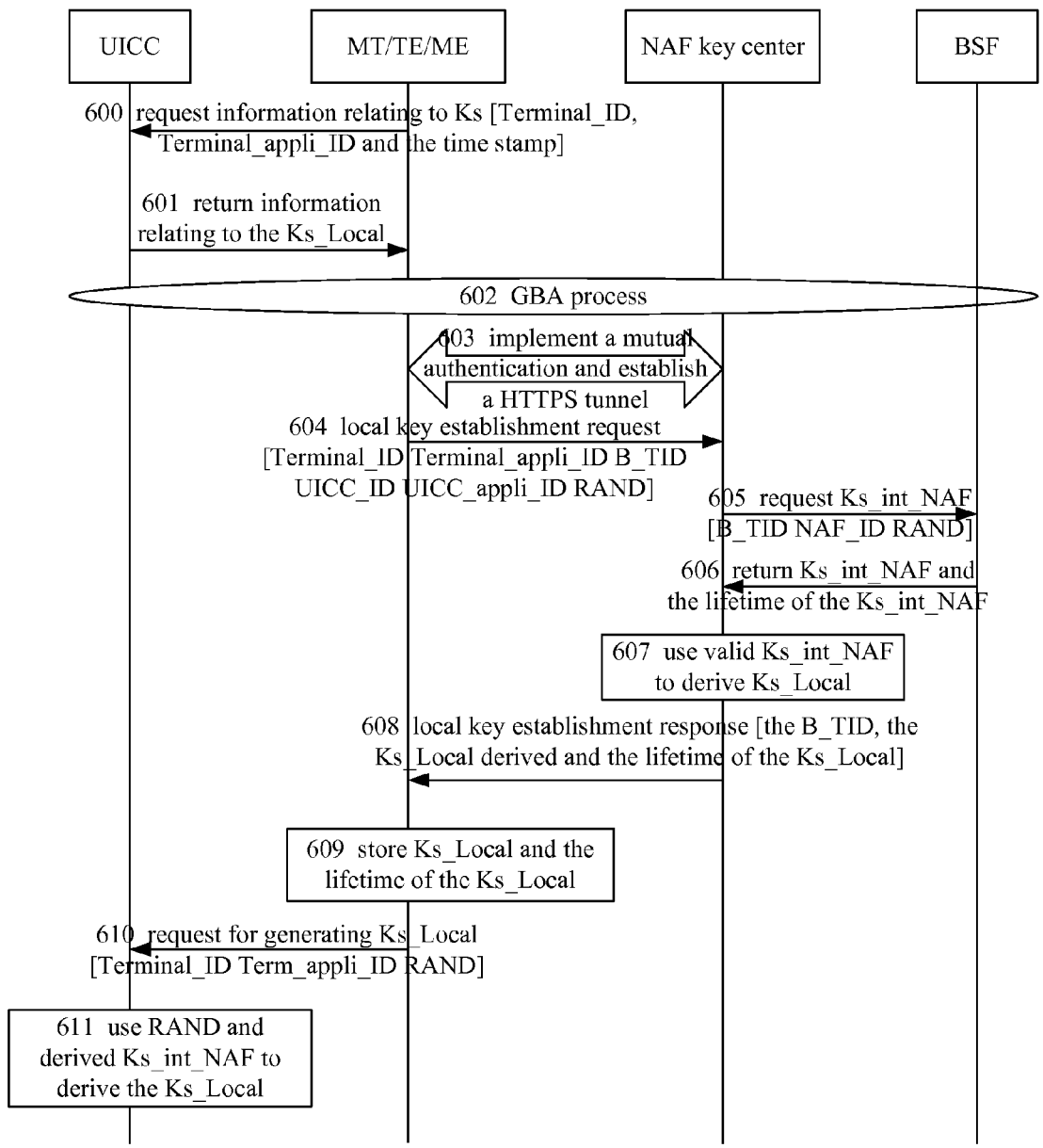
FIG. 6 is a flow chart showing a third embodiment in which the terminal obtains the local interface key, according to the present invention.

FIG. 6 is a flow chart showing a third embodiment in which the terminal obtains the local interface key, according to the present invention.

At Step 600, the terminal sends a request for requesting information relating to Ks to the UICC. The request may carry the Terminal_ID, the Terminal_appli_ID, and the time stamp of the terminal for indicating current time.

At Step 601, the UICC searches the Ks locally stored and returns the key lifetime, corresponding to the Ks and the B_TID, to the terminal.

If the time stamp is carried in the request from the terminal, the UICC may query whether a valid Ks exists on the UICC, according to the time stamp. If the valid Ks exists on the UICC, the key lifetime of the Ks and the B_TID are sent to the terminal, and the flow proceeds to Step 603. If the valid Ks does not exist on the UICC, the flow proceeds to Step 602.

The UICC compares the timestamp with the key lifetime to judge the validity of the Ks. If the key lifetime is larger than the timestamp, the Ks is valid. If the key lifetime is smaller than the timestamp, the Ks is invalid.

At Step 602, a GBA process is initiated to generate a valid Ks.

At Step 602, a plurality of condition may trigger the GBA process. If the terminal is a ME to which the UICC belongs to, the ME directly initiates the GBA process. If the terminal is a periphery terminal connected to the UICC via a periphery interface, the periphery terminal may send an instruction to the UICC, and then the UICC sends an active command to the ME to trigger the GBA process, or the UICC sends an active command to the ME to trigger the GBA process after finding that no valid Ks exists, or the periphery terminal directly sends a command to the ME to trigger the GBA process. Additionally, the terminal may also initiate the GBA process.

The object of the GBA is to generate a Ks and store the Ks in the UICC.

At Step 603, the terminal and the NAF implement a mutual authentication, and a HTTPS tunnel is established.

The implementation of Step 603 is known in the art, and repeated description thereof is omitted herein.

At Step 604, the terminal sends the local key establishment request to the NAF key center, via the established HTTPS tunnel.

The local key establishment request may carry the B_TID which is generated in the GBA process of Step 602, or is returned to the terminal from the UICC, the Terminal_ID, the Terminal_appli_ID, the UICC_ID, the UICC_appli_ID, and the random number RAND generated by the terminal or the UICC. Thus, the NAF key center may generate a valid local interface key for each application.

At Step 605, the NAF key center sends a request for requesting the Ks_int_NAF to the BSF, and the request may carry the received B_TID, the random number RAND, and the NAF_ID. The random number may be sent from the terminal, or be generated by the NAF key center at Step 604.

At Step 606, the BSF uses parameters, such as the Ks corresponding to the B_TID, the NAF_ID, and the random number RAND, to derive the Ks_int_NAF and assign corresponding key lifetime to the Ks_int_NAF, and sends the Ks_int_NAF and the key lifetime of the Ks_int_NAF to the NAF key center.

In this step, by using the random number RAND, the Ks_int_NAF derived from Ks is different from the Ks_int_NAF used previously.

At Step 607, the NAF key center uses the received Ks_int_NAF to derive the Ks_Local.

At Step 607, before the NAF key center uses the valid Ks_int_NAF to derive the Ks_Local, the flow further includes: querying, by the NAF key center, whether the terminal is limited to use the UICC to access the network, according to the Terminal_ID and UICC_ID. If the terminal is allowed to use the UICC to access the network, the Ks_int_NAF and related information is used to derive the Ks_Local.

If the terminal is not allowed to use the UICC to access the network, a response for indicating that the terminal has no right to use the UICC to access the network is returned.

At Step 608, the NAF key center sends a local key establishment response carrying the B_TID, the Ks_Local, and the lifetime of the Ks_Local to the terminal, via the HTTPS tunnel.

At Step 609, the terminal stores the Ks_Local received and the lifetime of the Ks_Local.

At Step 610, the terminal sends a request for generating the Ks_Local to the UICC, and the request carries the Terminal_ID and the Terminal_appli_ID.

At Step 611, the UICC uses parameters, such as the Ks, NAF_ID, and the random number RAND, to derive the Ks_int_NAF, then uses the Ks_int_NAF to derive the Ks_Local, and stores the Ks_Local.

The UICC and the NAF key center use the same algorithm to derive the Ks_Local.

If the random number RAND is generated by the terminal or the UICC, the step for deriving the Ks_int_NAF using the Ks, NAF_ID, and the random number RAND among Steps 610-611 may also be performed at any step which is before Step 610 and after Step 602. This embodiment only describes an example and the interaction sequence among the terminal, the UICC and the network side is not limited thereto.

To this end, the terminal and the UICC share the Ks_Local and use the Ks_Local to implement a secure communication.

According to the first, second, and third embodiments, the method for obtaining the Ks_Local in accordance with the first and the second embodiments includes: deriving a Ks_Local, which is different from the Ks_Local previously derived, by using a variable parameter, such as the random number, the time stamp, and the valid Ks_int_NAF in the key information; while the method for obtaining the Ks_Local in accordance with the third embodiment includes: deriving a Ks_int_NAF, which is different from the Ks_int_NAF previously derived, by using a variable parameter, such as the random number, the time stamp, and the Ks in the key information; and deriving a Ks_Local by using the Ks_int_NAF.

The UICC side and the BSF may use the variable parameter and the Ks to calculate the variable parameter of the Ks_int_NAF. In this embodiment, the variable parameter is generated by the terminal. Optionally, the variable parameter may also be generated by the NAF key center, carried in the request message at Step 605 and sent to the BSF, and then sent to the UICC side through Steps 608, 609, and 610. Optionally, the variable parameter may also be generated at Step 606, and be sent to the UICC side through sequent steps.

In the above embodiments, the complete GBA process needs not to be performed, and the process for obtaining the Ks_Local is simplified. The local interface key is easy to be obtained and the time for negotiating the Ks_Local is saved, and, thus, the network resources are saved. Meanwhile, the Ks_Local obtained through the derivation with the variable parameter is different from the Ks_Local used previously, and, thus, the security level is ensured.

Before the implementation of the first embodiment and the second embodiment, Steps 600-602 in the third embodiment may also be performed. Accordingly, Steps 400-401 in the first embodiment and Steps 500-501 in the second embodiment may be omitted.

Additionally, if a Ks_Local which does not expire is lost because the terminal is powered off and so on, except that the terminal use the method according to the first, second, or third embodiment to obtain the Ks_Local, the terminal may also obtain information related to the Ks_Local, such as B_TID and corresponding application identity, through an interaction with the UICC, and directly requests the Ks_Local corresponding to the B_TID from the NAF key center when the terminal needs to use the application. The detailed implementation is described with reference to the fourth and the fifth embodiments below.

In the fourth embodiment, the Ks_Local exists on the UICC and does not expire.

Figure 7:
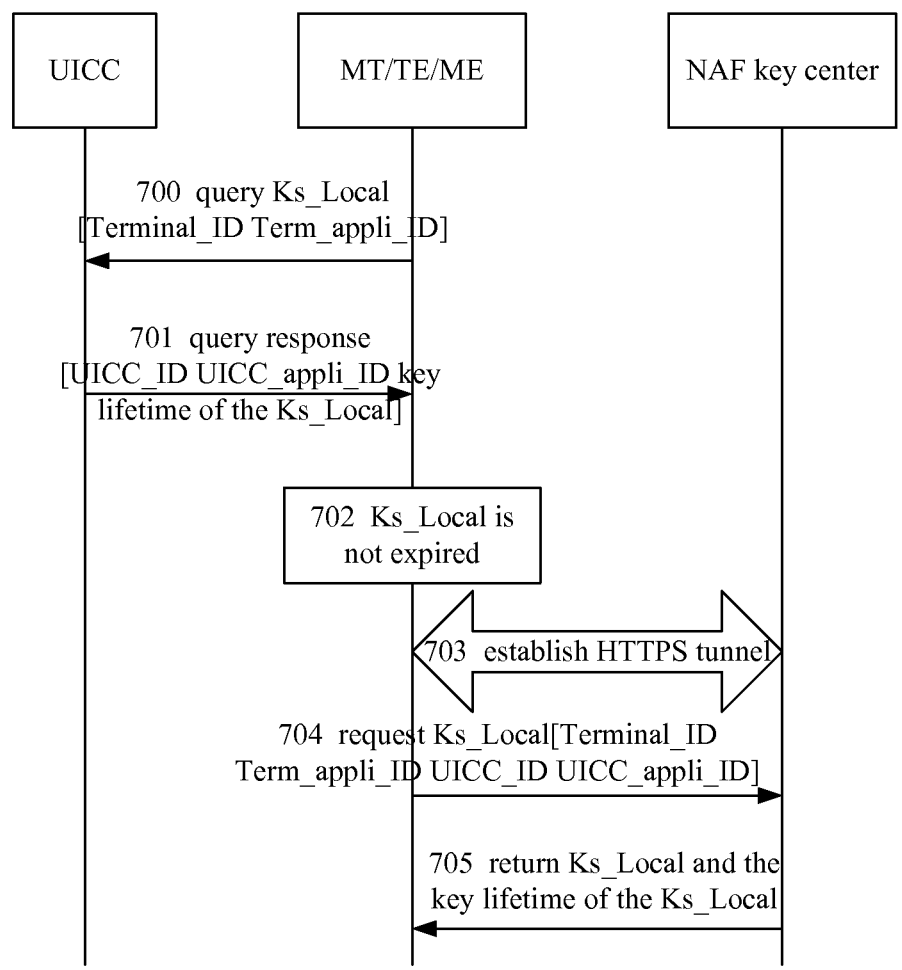
FIG. 7 is a flow chart showing a fourth embodiment in which the terminal obtains the local interface key, according to the present invention.

FIG. 7 is a flow chart showing the fourth embodiment in which the terminal obtains the local interface key, according to the present invention. The flow includes the following steps.

At Step 700, the terminal sends a request for querying the Ks_Local to the UICC, and the request includes the Terminal_ID and the Terminal_appli_ID.

At Step 701, the UICC queries the locally stored Ks_Local corresponding to the Terminal_ID and the Terminal_appli_ID, and the UICC carries the key lifetime of the Ks_Local in a query response and sends the query response to the terminal. The query response also carries the UICC_ID and the UICC_appli_ID.

If the UICC does not store the Ks_Local corresponding to the Terminal_ID and the Terminal_appli_ID, the UICC informs the terminal that no Ks_Local exists. Then, the terminal may use the method according to the first, second, or third embodiment to obtain the Ks_Local.

At Step 702, the terminal requests the Ks_Local from the NAF key center, after the terminal determines that the Ks_Local does not expire, according to the key lifetime of the Ks_Local and the timing mechanism of the terminal.

If the Ks_Local expires, the terminal uses the method according to the first, second, or third embodiment to obtain the Ks_Local.

When the terminal determines that the Ks_Local expires, the terminal sends a request for deleting the expired Ks_Local and a request for establishing a new Ks_Local to the UICC. The request for deleting the expired Ks_Local and the request for establishing a new Ks_Local may be carried in one message or be carried in two messages, respectively. Optionally, the terminal may only send the request for deleting the expired Ks_local or the request for establishing a new Ks_Local to UICC.

At Step 703, the terminal implements a mutual authentication with the NAF and establishes a HTTPS tunnel.

There a plurality of methods for implementing Step 703, and the methods are known in the art. Thus, repeated descriptions are omitted herein.

At Step 704, the terminal sends a request for requesting the Ks_Local from the NAF key center through the HTTPS tunnel established. The request carries the Terminal_ID, the Terminal_appli_ID, the UICC_ID, and the UICC_appli_ID.

At Step 705, after the NAF key center finds the Ks_Local corresponding to the information carried in the request, the NAF key center returns the Ks_Local and the key lifetime of the Ks_Local to the terminal.

To this end, the terminal and the UICC share the Ks_Local and use the Ks_Local to implement a secure communication.

At Step 701, because the key lifetime is transmitted without encryption, an attacker may illegally modify the key lifetime when the UICC sends the key lifetime to the Ks_Local. At Step 704, in order to ensure that the UICC and the terminal share a valid Ks_Local, the NAF key center further needs to authenticate the key lifetime of the Ks_Local after the NAF key center finds the Ks_Local, so as to judge whether the Ks_Local expires.

In the fifth embodiment, the Ks_Local exists on the UICC and does not expire.

Figure 8:
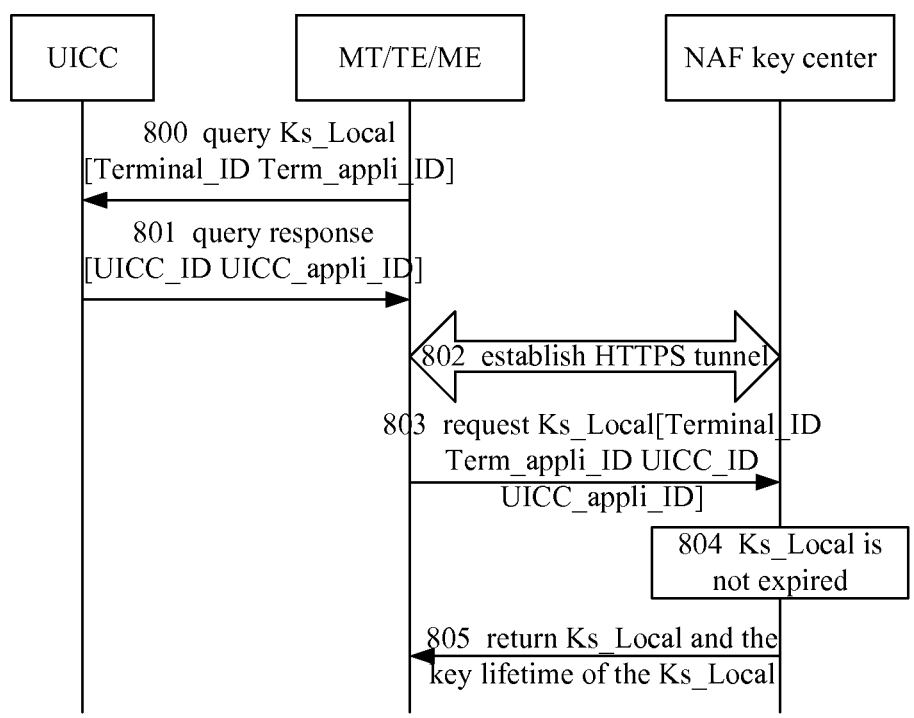
FIG. 8 is a flow chart showing a fifth embodiment in which the terminal obtains the local interface key, according to the present invention.

FIG. 8 is a flow chart showing the fifth embodiment in which the terminal obtains the local interface key, according to the present invention. The flow includes the following steps.

At Step 800, the terminal sends a request for querying the Ks_Local to the UICC, and the request includes the Terminal_ID and the Terminal_appli_ID.

At Step 801, the UICC queries the locally stored Ks_Local corresponding to the Terminal_ID and the Terminal_appli_ID, and the UICC carries the UICC_ID and UICC_appli_ID of the UICC in a query response and sends the query response to the terminal, so as to inform the terminal that the Ks_Local queried by the terminal exists on the UICC.

If the UICC does not store the Ks_Local corresponding to the Terminal_ID and the Terminal_appli_ID, the UICC informs the terminal that no Ks_Local exists. Then, the terminal may use the method according to the first, second, or third embodiment to obtain the Ks_Local.

At Step 802, the terminal implements a mutual authentication with the NAF and establishes a HTTPS tunnel.

There is a plurality of methods for implementing Step 802, and the methods are known in the art. Thus, repeated descriptions are omitted herein.

At Step 803, the terminal sends a request for requesting the Ks_Local from the NAF key center through the HTTPS tunnel established. The request carries the Terminal_ID, the Terminal_appli_ID, the UICC_ID, and the UICC_appli_ID.

At Steps 804-805, after the NAF key center finds the Ks_Local corresponding to the Terminal_appli_ID received and determines that the Ks_Local does not expire, the NAF key center returns the Ks_Local and the key lifetime of the Ks_Local to the terminal through the HTTPS tunnel.

If the Ks_Local expires, the terminal uses the method according to the first, second, or third embodiment to obtain the Ks_Local.

To this end, the terminal and the UICC share the Ks_Local and use the Ks_Local to implement a secure communication.

As can be seen from the fourth and the fifth embodiments, if the Ks_Local is lost because the terminal is powered off and so on while the UICC still stores the Ks_Local, and the Ks_Local does not expire, the terminal only needs to request the lost key from the NAF key center, and a complete key negotiation process is not needed. The method according to the fourth embodiment and the fifth embodiment further simplify the process for obtaining the Ks_Local and, thus, the local interface key is easy to be obtained.

The present invention also provides a terminal, including a variable parameter generation module and a sending module.

The variable parameter generation module is adapted to generate a variable parameter.

The sending module is adapted to sending the variable parameter generated to a UICC or a network side.

The present invention also provides a UICC, including a first receiving module and a first processing module.

The first receiving module is adapted to receive a variable parameter from a terminal.

The first processing module is adapted to derive a local interface key, by using the variable parameter received.

The present invention also provides a NAF, including a second receiving module and a second processing module.

The second receiving module is adapted to receive a variable parameter from a terminal.

The second processing module is adapted to derive a local interface key, according to the variable parameter received.

It should be emphasized that the above-described embodiments, particularly, any exemplary embodiments, are merely possible examples of the present invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method, comprising:
   obtaining, by a User Integrate Circuit Card (UICC), a variable parameter from a terminal, the variable parameter being generated by the terminal; and
   deriving, by the UICC, a local interface key for the UICC, wherein the local interface key for the UICC is for the UICC to securely communicate with the terminal,
   wherein the local interface key for the UICC is derived by the UICC in accordance with the obtained variable parameter, key identity information, and related parameters for calculating the local interface key, by adopting a key derivation algorithm, and
   wherein the local interface key for the UICC derived by the UICC is the same as a local interface key for the terminal, the local interface key for the terminal being used for the terminal to securely communicate with the UICC and being generated by adopting the same key derivation algorithm as that adopted by the UICC to derive the local interface key for the UICC.

2. The method according to claim 1, wherein the variable parameter is a random number or a time stamp.

3. The method according to claim 1, wherein the variable parameter is carried in a local key derivation instruction sent from the terminal to the UICC.

4. The method according to claim 1, wherein the derived local interface key for the UICC is different from a previously derived local interface key for the UICC.

5. The method according to claim 1, wherein the related parameters comprise at least one of the following: a network application function (NAF) entity related key, an identity of the terminal, a terminal application identity, a UICC identity and a UICC application identity.

6. The method according to claim 1, wherein the UICC is hosted in the terminal as a part of the terminal.

7. The method according to claim 1, wherein the UICC is hosted by a terminal device which is physically separated from the terminal.

8. A User Integrate Circuit Card (UICC), comprising:
   a processor configured to derive a local interface key for the UICC, wherein the local interface key for the UICC is used for securely protecting the UICC to communicate with a terminal,
   wherein the local interface key for the UICC is derived by using a variable parameter received from the terminal, key identity information, and related parameters for calculating the local interface key for the UICC, by adopting a key derivation algorithm, wherein the variable parameter is generated by the terminal, and
   wherein the local interface key for the UICC is same as a local interface key for the terminal, the local interface key for the terminal being used for the terminal to communicate with the UICC and being derived by adopting the same key derivation algorithm as that adopted by the UICC to derive the local interface key for the UICC.

9. The UICC according to claim 8, wherein the variable parameter is a random number or a time stamp.

10. The UICC according to claim 8, wherein the variable parameter is carried in a local key derivation instruction sent from the terminal to the UICC.

11. The UICC according to claim 8, wherein the derived local interface key for the UICC is different from a previously derived local interface key for the UICC.

12. The UICC according to claim 8, wherein the related parameters comprise one or more of: a Network Application Function (NAF) entity related key, an identity of the terminal, a terminal application identity, a user integrated circuit card (UICC) identity and a UICC application identity.

13. The UICC according to claim 8, wherein the UICC is hosted in the terminal as part of the terminal.

14. The UICC according to claim 8, wherein the UICC is hosted in a terminal device which is physically separated from the terminal.

* * * * *